United States Patent [19]

Ueba et al.

[11] Patent Number: 5,587,239
[45] Date of Patent: Dec. 24, 1996

[54] BALL-LIKE STRUCTURES AND CONTACTING MATERIALS FOR WASTEWATER-TREATMENT

[75] Inventors: Hisaaki Ueba; Yosio Sunaga; Tosio Nagasima, all of Tochigi-ken, Japan

[73] Assignees: Kureha Kagaku Kogyo Kabushiki; Kureha Gosen Kabushiki Kaisha, both of Japan

[21] Appl. No.: 265,963

[22] Filed: Jun. 27, 1994

[30] Foreign Application Priority Data

Jun. 29, 1993 [JP] Japan .................................. 5-185611

[51] Int. Cl.⁶ ............................ D02G 3/00; B32B 5/16; B01D 39/08
[52] U.S. Cl. .................. 428/362; 210/500.29; 210/505; 210/508; 210/928; 428/369; 428/370; 428/377; 428/402
[58] Field of Search ............................ 428/4, 5, 11, 362, 428/369, 370, 377, 402, 25; 678/742, 747; 210/928, 323.1, 348, 500.23, 500.27, 500.29, 505, 508

[56] References Cited

U.S. PATENT DOCUMENTS 3,184,363  5/1965  Strother .................................. 156/433
4,328,055  5/1982  Nakamura et al. ...................... 156/167
4,690,849  9/1987  Fukuda et al. ............................ 428/91

FOREIGN PATENT DOCUMENTS 2474071   1/1980  France .
1-35278  10/1989  Japan .
4-202837  7/1992  Japan .

*Primary Examiner*—Hoa T. Le
*Attorney, Agent, or Firm*—Nixon & Vanderhye

[57] ABSTRACT

Disclosure describes ball-like structures formed from bundled, crimped fibers rounded around a central portion thereof as a core, the core being formed with a molten-fused structure and having the following stipulations:

(a) a density of the molten-fused structure is not less than 75% based on a density of the crimped fibers forming the ball-like structures.

(b) a length of the molten-fused structure is 5 to 50% based on a diameter of the ball-like structures, and (c) a withdrawing strength of a crimped fiber strand connected with the molten-fused structure is not less than 50% based on a linear strength of the crimped fiber strand itself used for the ball-like structures.

4 Claims, 6 Drawing Sheets

BALL-LIKE STRUCTURES AND CONTACTING MATERIALS FOR WASTEWATER-TREATMENT

BACKGROUND OF THE INVENTION

The present invention related to ball-like structures and contacting materials for wastewater-treatment composed of the ball-like structures, and more in particular, it relates to ball-like structures formed from bundled, crimped fibers rounded around a roughly central portion thereof as a core. The ball-like structures according to the present invention can be used suitably, for example, as contacting materials for water-treatment, materials for fish culture and filtering materials.

Ball-like structures formed from bundled, crimped fibers rounded around a roughly central portion thereof as a core are known. For instance, Japanese Utility Model Publication No. 35278/1989 proposes contacting materials for wastewater-treatment, in which crimped fine fiber yarns are bundled and bound for gathering up at a roughly central portion into a bundle which is then rounded into a spherical shape and the bound portion is embedded to the inside of the bundle.

Further, Japanese Patent Application Laid-Open (KOKAI) No. 202837/1992 proposes a method of producing ball-like structures, which comprises binding a bundle composed of a plurality of crimped fibers aligned with each substantially constant interval successively, then cutting the bundle at an intermediate portion between the resultant adjacent bound portions, and further, applying a heat-treatment to the thus obtained fiber bundles in the form of short tufts.

The ball-like structures have a large specific surface area, since the constituent fibers are entangled in a three dimensional manner to each other into a spherical shape. Such ball-like structures have an advantageous effect of providing favorable settling of microorganisms, deposition of sludges to the ball-like structures and enhancing the growth of the microorganisms, when the ball-like structures are applied to a cleaning-treatment of wastewater due to self-cleaning effect of the microorganisms as described in Japanese Utility Model Publication No. 35278/1989.

However, in a case of the ball-like structures as described in Japanese Utility Model Publication No. 35278/1989, the core at the central portion (bound portion) has a bound structure using synthetic fiber yarns, rigid plastic bands or fine metal wires, so that the synthetic fibrous yarns or rigid plastic bands incapable of providing a firmly bound structure have a drawback that fibers constituting the ball-like structures are liable to slip off through the bound portion.

The foregoing drawback causes clogging in a water-treatment bath in a case of using the ball-like structures as the contacting materials for water-treatment. Also in a case of using the ball-like structures, for example, as materials for fish culture and filtration, it also causes clogging in relevant facilities. Then, in a case of using the ball-like structures as the contacting materials for water-treatment, the slipping-off of the fibers is remarkable, particularly, upon backwashing in which the ball-like structures collide violently against each other.

On the other hand, in a case of a firm bound structure using fine wires of metal such as aluminum, although slipping-off of fibers through the bound portion can be improved, it causes an additional problem in view of waste disposal in that the fine metal wires are left after burning-treatment of the spent ball-like structures. Further, in a backwashing operation for the contacting materials used for water-treatment, an aqueous alkali or acid solution is sometimes used for improving the detergent effect. In this case, the binding member made of fine wires of metal such as aluminum can not be used because of poor chemical resistance. Moreover, in the ball-like structures using the fine metal wire as the binding member, since the diameter of the metal ring constituting the bound portion (diameter of the bound fibers) is constant, it inevitably has a drawback that the bound portion is loosened as detachment of the fibers from the bound portion occurs and the fibers slip off one by one to disintegrate the ball-like structures.

Also, the Japanese Patent Laid-Open Publication No. 202837/1992 discloses an example of ball-like structures of a bound structure using aluminum wires, but there is no detailed description for the ball-like structures having the molten-fused structure as a bound structure.

In view of the foregoing situations, as a result of earnest present inventors' studies, it has been found that ball-like structures, wherein the bundled, crimped fibers are melted and fused about at a central portion, and which satisfy the following stipulations, can be free from yarn slipping-off or yarn disconnection and can be served for practical use.

(a) A density of the molten-fused structure is not less than 75% based on a density of the crimped fibers constituting the ball-like structures.

(b) A length of the molten-fused structure is 5 to 50% based on a diameter of the ball-like structures.

(c) A withdrawing strength of the crimped fiber strand connected to the molten-fused structure is not less than 50% based on a linear strength of the crimped fiber strand itself used for the ball-like structures.

The present invention has been accomplished based on the above-mentioned finding.

SUMMARY OF THE INVENTION

An object of the present invention is to provide ball-like structures which are suitable as contacting materials for treatment of wastewater and easy for burning-treatment, can be applied with effective backwashing-treatment with acid or alkali and scarcely causes detachment of constituent fibers.

To accomplish the aim, in a first aspect of the present invention, there is provided ball-like structures formed from bundled, crimped fibers rounded around a central portion thereof as a core, wherein the core is formed with a molten-fused structure and the following stipulations are satisfied simultaneously:

(a) a ratio of the specific gravity of the molten-fused fibers forming the ball structures divided by the specific gravity of the material that forms the fibers, expressed as a percentage, is at least 75%, (b) a length of the molten-fused structure is 5 to 50% based on a diameter of the ball-like structures, and (c) a withdrawing strength of a crimped fiber strand connected with the molten-fused structure is not less than 50% based on a linear strength of the crimped fiber strand itself used for the ball-like structures.

In a second aspect of the present invention, there is provided contacting materials for use in wastewater-treatment comprising the ball-like structures as defined in the first aspect.

DETAILED DESCRIPTION OF THE INVENTION

Figure 1A:
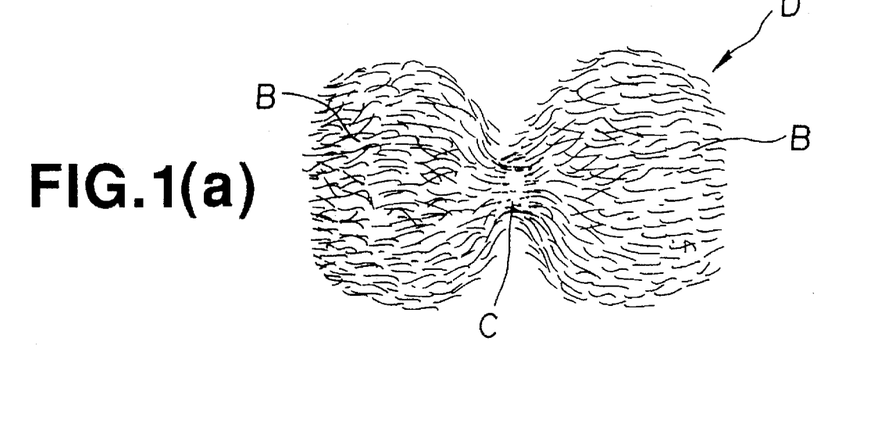
FIG. 1(a) is an explanatory view of a pre-form (D) of ball-like structures according to the present invention.
Figure 1B:
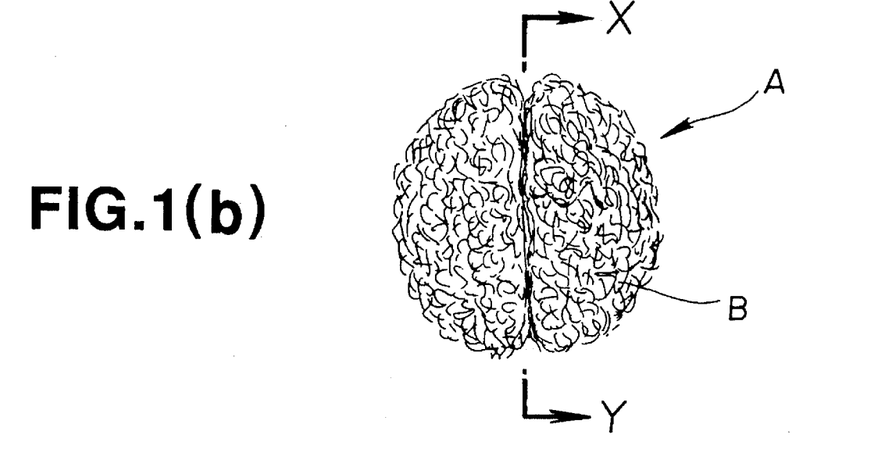
FIG. 1(b) is an explanatory view of ball-like structures (A) according to the present invention.
Figure 1C:
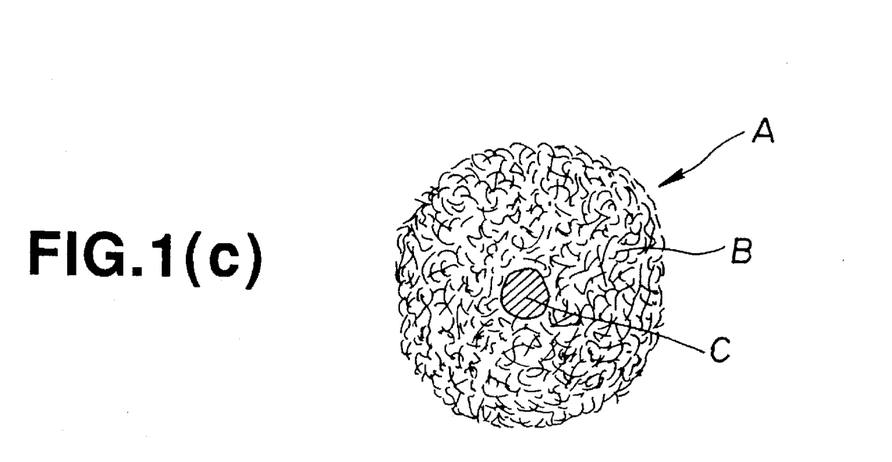
FIG. 1(c) is an explanatory cross sectional view of the ball-like structures (A) according to the present invention taken along line X–Y in FIG. 1(b)

FIG. 1(a) is an explanatory view for a pre-form (D) of ball-like structures according to the present invention, FIG. 1(b) is an explanatory view of ball-like structures (A) according to the present invention, and FIG. 1(c) is an explanatory cross sectional view of the ball-like structures (A) according to the present invention taken along line X–Y in FIG. 1(b).

In the present specification, the term "detachment" of crimped fibers constituting the ball-like structures means both of a state in which fibers are detached through a fused structure (in which each of the fibers is separated for its substantially entire length from the ball-like structures) and a state in which fibers are partially cut into a yarn disconnection state (in which fibers are cut at the base end of the fused structure in most cases). The "fiber slipping-off" is caused under the effect of water stream, or the effect of mechanical external forces due to collision between each of the ball-like structures or collision between the ball-like structures and vessel walls, which mainly has a concern with the density of the molten-fused structure. Further, "yarn disconnection" has a concern with a withdrawing strength of a crimped fiber strand connected to the molten-fused structure.

Descriptions will now be made at first to the ball-like structures according to the present invention.

The ball-like structures (A) of the present invention are formed from bundled, crimped fibers around a central portion thereof as a core, in which the core is formed with a molten-fused structure (C).

Namely, the ball-like structures (A) of the present invention have structures, in which a bundle (B) of crimped fibers is molten-fused integrally around a central portion thereof and individual crimped fibers grow from the molten-fused structure (C). As a result, the ball-like structures (A) of the present invention basically have a structure, in which fibers less detachment as compared with existent ball-like structures in which a bundled portion is formed with a bound structure.

The bundle (B) of the crimped fibers usually comprises from 100 to 100,000 crimped fibers. Any of synthetic fibers may be used for the crimped fibers so long as they have crimping nature and there can be cited, for example, fibers of synthetic resins such as vinyl chloride-based resins, vinylidene chloride-based resins, polyamides, polyesters, urethane-based resins or polypropylenes. Particularly, fibers of vinylidene chloride-based resins are suitable, since they are excellent in durability and sludge adsorbability.

The extent of crimping in the crimped fibers is usually in a range from 1 to 25 turns/inch. The diameter of the fiber is usually from 1 to 1,000 denier, preferably 10 to 300 denier. The cross sectional shape of the fiber is not restricted only to a circular shape, but any other shape such as elliptic, rectangular, trigonal or hollow shape may also be adopted. The fibers having a linear strength of not less than 10 g is used usually.

Use of fibers having a heat-shrinkability in addition to the crimping property is preferred, since they are firmly tightened, particularly, at a surface forming portion by shrinking in a heat-processing step of the manufacturing process to be described later, thereby making the fiber distribution in the ball-like structures (A) entirely uniformly. In this case, the heat-shrinkage factor of the fibers is determined as in a range from 5 to 50% at a heat-treatment temperature employed. The heat-shrinkage factor means a value measured for a fiber of 100 mm in length after heat-treatment for 10 min at the above-mentioned temperature in accordance with JIS L 1013.

Further, crimped fibers obtained from long fibers may also be used and, further, either finished or not-finished yarns may be used. As the finished yarn, crimped thread or woolly finished thread is suitable. The bundle (B) of the crimped fibers may be composed of identical fibers or different materials may be mixed together.

It is essential that the ball-like structures (A) of the present invention can satisfy the following stipulations (a)–(c), simultaneously. Since such stipulations are satisfied, the ball-like structures (A) of the present invention can reliably prevent fibers from detaching through the molten-fused structure (C). In addition, the ball-like structures (A) of the present invention are rounded, although the core is formed with the molten-fused structure (C), and in addition, can suppress yarn disconnection at the root of the molten-fused structure (C) to a level comparable with that of a bound structure with aluminum wires.

(a) The ratio of the specific gravity of the molten-fused structure (c) forming the ball-like structures (A) divided by the specific gravity of the material that forms the fibers, expressed as a percentage, is at least 75%, and preferably at least 80%. If this condition is satisfied, the specific gravity of the molten-fused structure is increased to effectively prevent slipping-off of the fibers. Since the molten-fused structure (C) is formed by integrating the bundle (B) of the crimped fibers by melting and fusion, it has a columnar shape of a predetermined length, and there is no particular restriction on the cross sectional shape thereof.

(b): The length of the molten-fused structure (C) is from 5 to 50%, preferably 10 to 30% based on the diameter of the ball-like structures (A). If the length rate is greater than the above-mentioned range, it is difficult to form the appearance of the ball-like structures (A) to a such a spherical shape as providing a closest packing and the fiber distribution in the ball-like structures (A) is scattered.

(c): The withdrawing strength of the crimped fiber strand connected with the molten-fused structure is not less than 50%, preferably not less than 65% based on the linear strength of the crimped fiber strand itself used for the ball-like structures. This condition has a concern as to whether or not the molten-fused structure (C) is formed under appropriate melting conditions in the production process to be described later. Namely, if the melting conditions are not adequate, the strength rate described above is less than 50%, resulting in yarn disconnection of the crimped fibers at the base end of the molten-fused structure (C) under the effect of collision between each of the ball-like structures (A) or the water stream during use of the ball-like structures (A), particularly, during backwashing.

Figure 8:
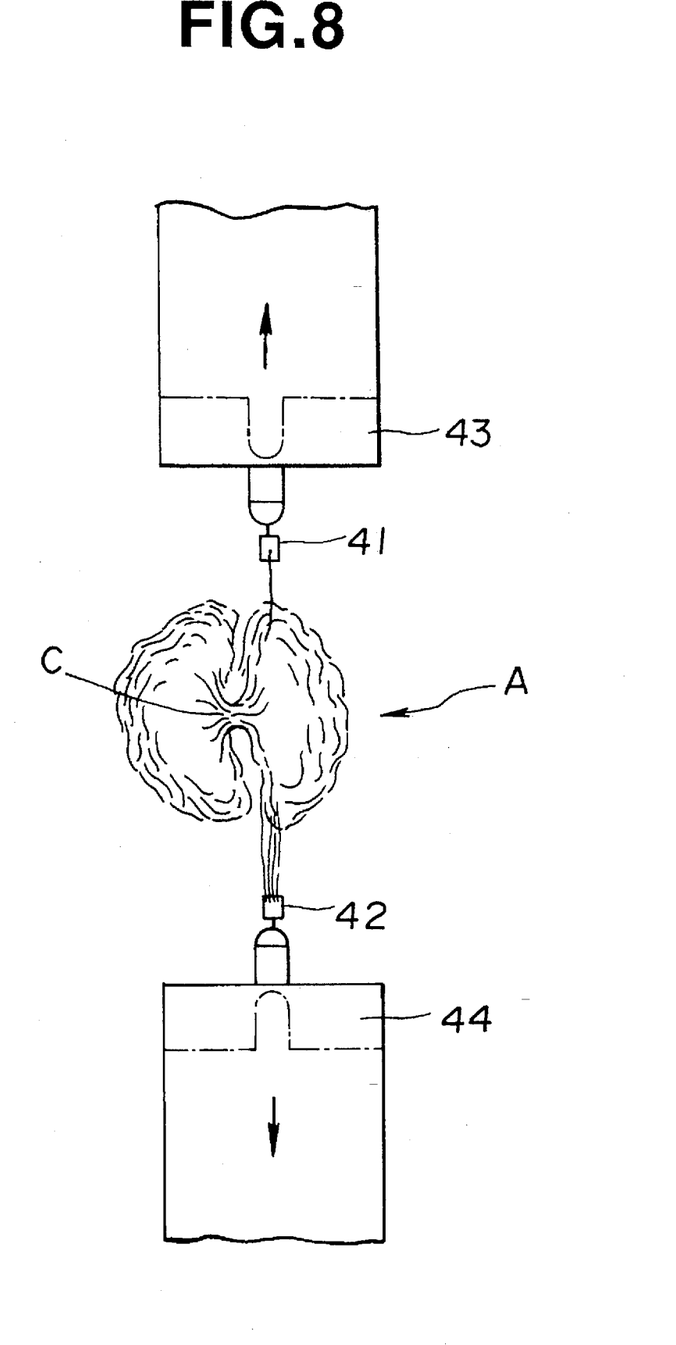
FIG. 8 is an explanatory view showing a method of measuring a withdrawing strength of a crimped fiber strand connected with a molten-fused structure.

The withdrawing strength of the crimped fiber strand connected with the molten-fused structure is measured by using "Universal Tensilon Tester UCT-100" (trade name, manufactured by Orintec Corporation) in accordance with the method shown in FIG. 8. Namely, the tensile strength is determined by selecting and drawing a strand from a bundle of the crimped fibers on one of right and left bound portions (molten-fused structure) (C) of the ball-like structures (A), fixing it by means of an adhesive tape, for example, "cellophane tape" 41 to one fixing jig 43 of the tester in the extending condition, taking out and drawing plurality (for example, 5 to 10) of crimped fibers from the bundle of the crimped fibers on the identical side, fixing them to the other fixing jig 44 of the tester by means of an adhesive tape 42, and spacing apart the fixing jigs 43 and 44 to measure the maximum stress. The measured value is called as a withdrawing strength. Measurement is carried out under the conditions at a distance from the bound portion to the adhesive tape as 10 mm and at a tensile speed of 30 mm/min. However, if the length of the single strand left on the side of the adhesive tape 41 is equal with the length of the crimped fiber constituting the ball-like structures (A), it is judged as the yarn detachment from the molten-fused structure (C) and this is excluded from the data.

The volume of the molten-fused structure (C) is from 1 to 30%, preferably 1 to 15% based on the volume of the ball-like structures (A). If the volume ratio is less than the above-mentioned range, the ratio of the molten-fused structure (C) based on the bundle (B) of the crimped fibers is too small, so that formation of the molten-fused structure (C) as the core for bundling the crimped fibers is made difficult. On the contrary, if the volume rate is greater than the above-mentioned range, the utilization factor of the fibers in the ball-like structures (A) is reduced.

The crimping rate of the fibers in the ball-like structures (A) of the present invention is defined as in a range of 10 to 75%, preferably 20 to 60%. If the crimping rate is less than 10%, crimping is too small to obtain enough entanglement between each of the fibers. On the other hand, if the crimping rate exceeds 75%, the fibers themselves take an excessively coiled shape, so that no sufficient entanglement can be obtained between each of the fibers, making it difficult to form the appearance of the ball-like structures (A) into the preferred spherical shape as described above.

In the present invention, the crimping rate is expressed in accordance with the definition of JIS L 0208 as $[(a-b)/(a) \times 100\%]$, wherein "a" represents a length of the fiber when the crimped fiber is elongated, and "b" represents a length of the crimped fiber. The length (b) of the crimped fiber means the shortest distance between both ends of the crimped fiber when it is left as it is. The length can be measured in accordance with JIS L 1015.

The size of the ball-like structures (A), that is, the outer diameter is preferably from 10 to 100 mm, preferably from 20 to 60 mm although there is no particular restriction.

Explanations will then be made to the method of manufacturing the ball-like structures (A) according to the present invention.

Figure 2:
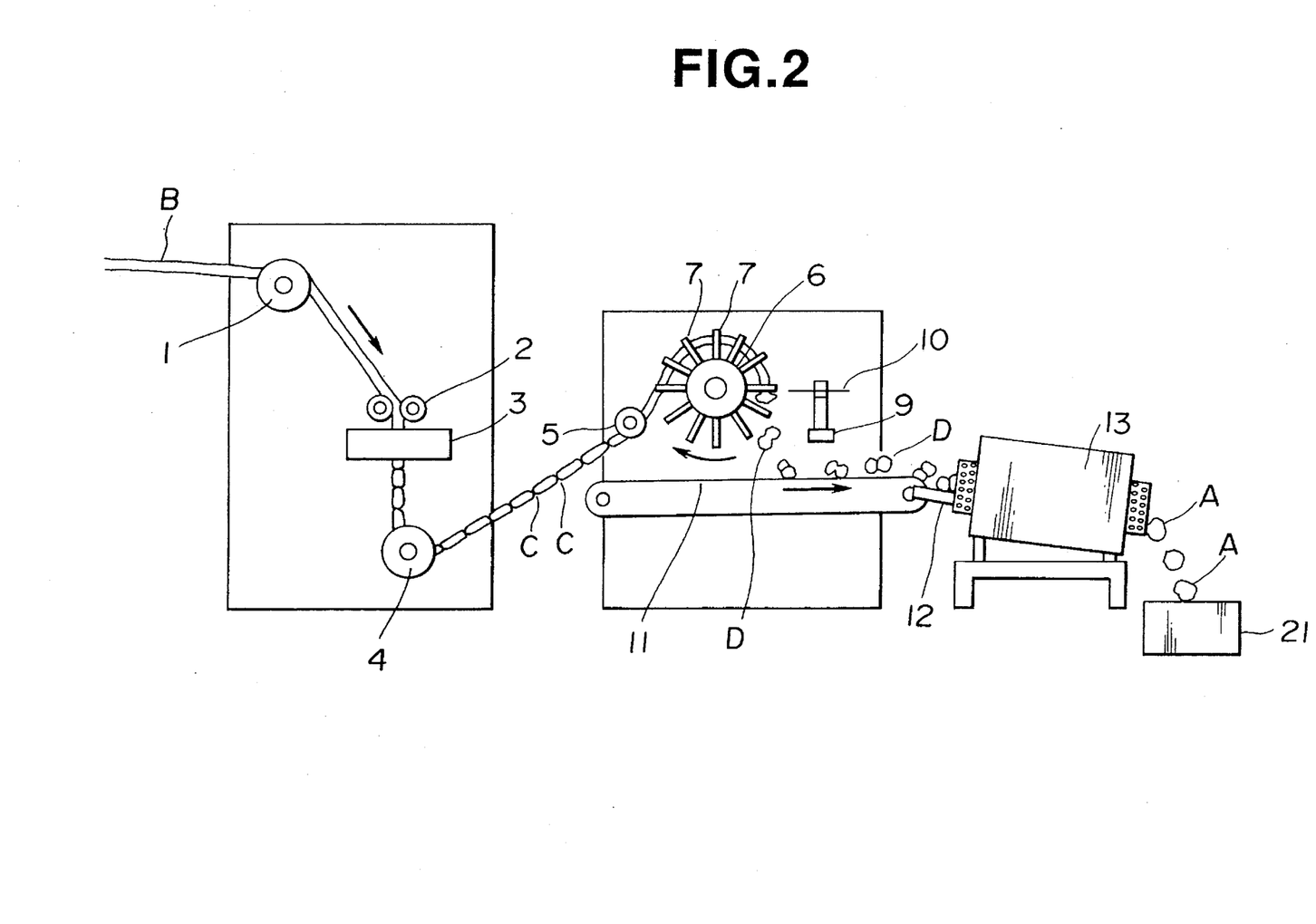
FIG. 2 is an explanatory view for an example of an apparatus for manufacturing ball-like structures according to the present invention.
Figure 3:
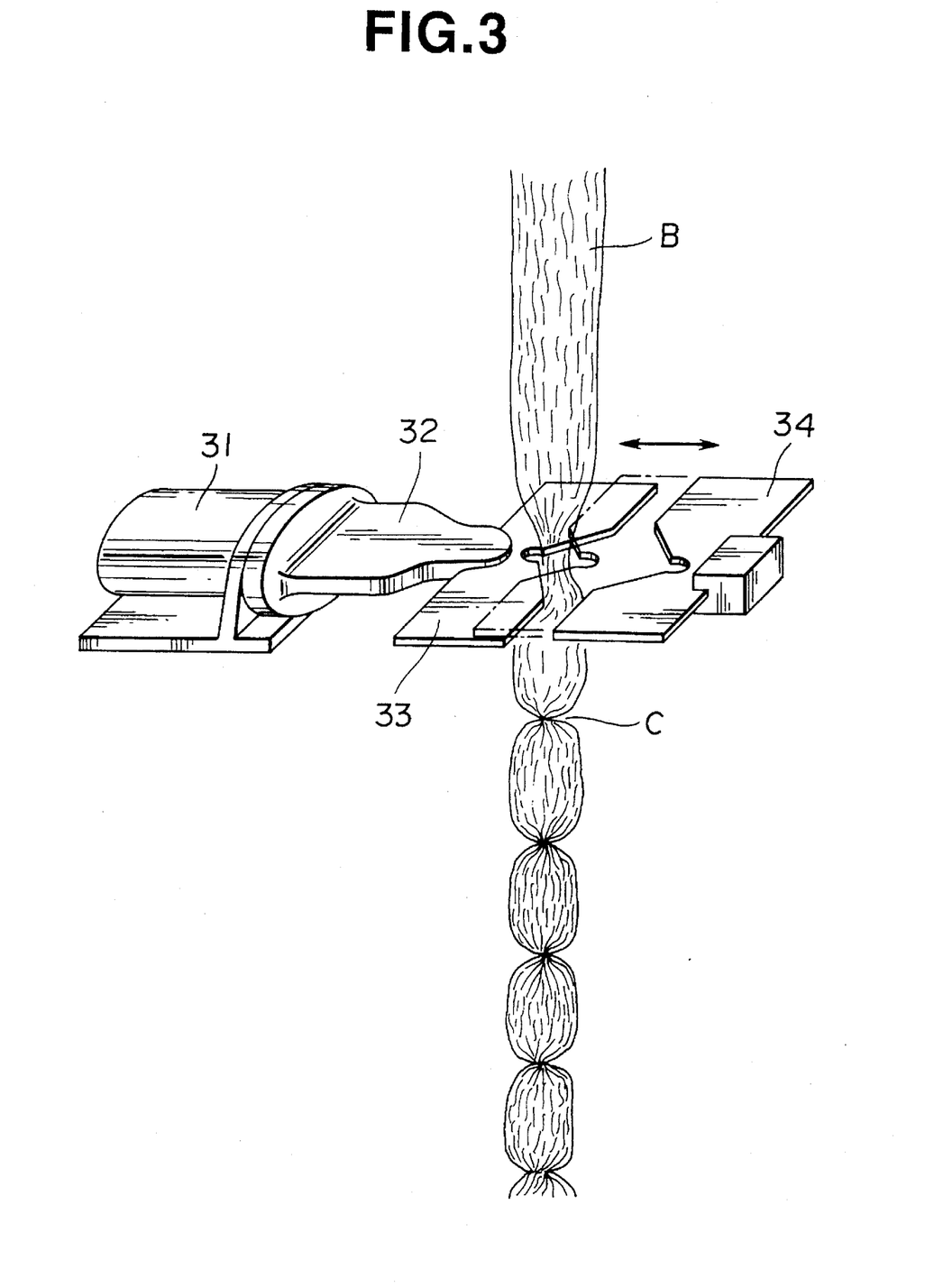
FIG. 3 is an explanatory view for a portion of an example of an apparatus for manufacturing ball-like structures according to the present invention.
Figure 4:
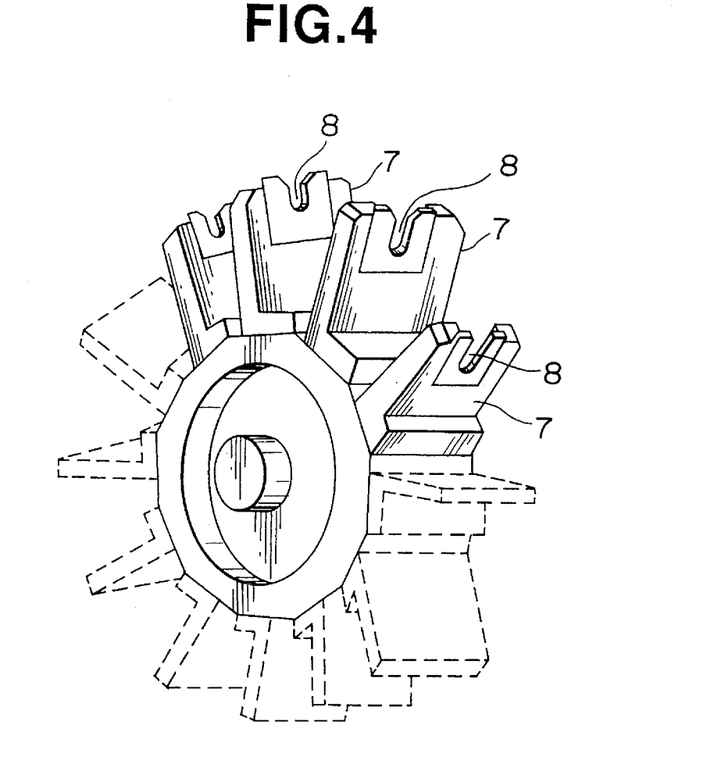
FIG. 4 is an explanatory view for a portion of an example of an apparatus for manufacturing ball-like structures according to the present invention.
Figure 5:
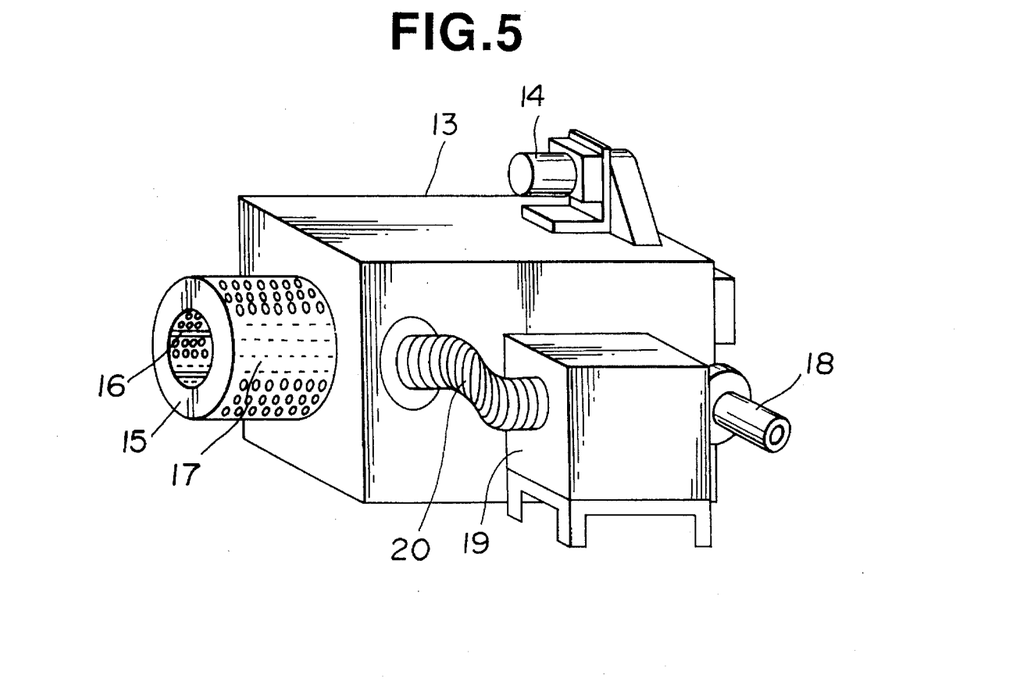
FIG. 5 is an explanatory view for a portion of an example of an apparatus for manufacturing ball-like structures according to the present invention.

FIG. 2 is an explanatory view for an example of an apparatus for manufacturing the ball-like structures according to the present invention and FIG. 3 through FIG. 5 are explanatory views for the examples of main portions of an apparatus for manufacturing the ball-like structures according to the present invention.

The ball-like structures (A) according to the present invention can be obtained by drawing the bundle (B) of crimped fibers around a central portion, melting and fusing the fibers and then rounding them into a spherical shape, by which the formed molten-fused structure (C) is embedded to the inside of the bundle (B) of the crimped fibers.

The ball-like structures (A) can be obtained basically in accordance with the manufacturing method as described in Japanese Patent Application Laid Open (KOKAI) No. 202837/1992, except that the bundle (B) of the crimped fibers is molten-fused around the central portion. Namely, the ball-like structures are obtained by drawing and melt-fusing the bundle (B) of the crimped fibers comprising a plurality of aligned crimped fibers, then cutting them at a midway between the thus formed adjacent melt-fused structures (C) and (C), and applying a heat-treatment to the thus obtained bundle (B) of short crimped fibers, thereby embedding the molten-fused structure (C) to the inside of the bundle (B) of the crimped fibers.

For preparing the ball-like structures (A) according to the present invention, fibers having a latent shrinking property can also be obtained in addition to the actually crimped fibers. That is, such latent crimping fibers can develop crimping by the heat-treatment.

At first, as shown in FIG. 2, a bundle (B) of long fibers comprising crimped fibers or latent crimping fibers are introduced by way of a guide roller 1 and a pinch roller 2 to a melt-fusing step 3 being pulled by a V-shaped gear 6. In the melt-fusing step 3, an ultrasonic fusion device is used preferably with the reason that uniform heating is applied easily as far as the inside of the fiber bundle and cooling for the molten portion after fusion can be conducted in a short period of time. In the melt-fusing step 3, the bundle (B) of the fibers is drawn and melt-fused on every appropriate constant interval, for example, between 3–30 cm to form the molten-fused structure (C).

As shown in FIG. 3, an ultrasonic fusing device comprises an oscillator 31, a horn 32, and a pair of bundling plate 33 and 34. The pair of the bundling plate 33 and 34 have both functions of bundling and melt-fusing the fiber bundle (B). That is, the bundling plates 33 and 34 are disposed at staggered positions such that they overlap vertically closed to each other, by which the fiber bundle (B) introduced to a position between the bundling plates 33 and 34 from a machine direction is drawn under bundling along V-shaped recesses at the top ends of the bundling plates in accordance with the movement of the bundling plate 33 and 34 and approaching to each other then fused by ultrasonic irradiation in the restricted state. After applying ultrasonic waves for a predetermined period of time to the bundling plates 33 and 34 to melt and fuse, the ultrasonic irradiation is interrupted in this state to cool the melt-fused portion for a predetermined period of time. Subsequently, the bundling plate 33 and 34 are spaced apart from each other for conducting bundling and melt-fusion of the next step.

Then, the fiber bundle (B) to which the molten-fused structure (C) has been formed is taken up on a V-shaped gear 6 by way of guide rollers 4 and 5. The V-shaped gear 6 is rotatable in the direction shown by an arrow in FIG. 2 and has a plurality of teeth 7. As specifically shown in FIG. 4, each of the teeth 7 has a V-shaped recess 8 at the central portion of the top end. The V-shaped recess may be a V-shaped configuration.

The V-shaped gear 6 rotates intermittently or continuously so as to pull the fiber bundle (B) by catching the molten-fused structure (C) formed to the fiber bundle (B) on the V-shaped recess 8. The distance between each of adjacent V-shaped recesses 8 and 8 is preferably made slightly greater than the distance between each of the molten-fused structures (C) and (C). Then, the tension exerted on the fiber bundle (B) can be adjusted by changing the distance and/or gap.

Then, in a case of the crimped fibers, it is preferred to apply such an extent of tension that the fiber bundle (B) is drawn into a substantially linear shape. This is because fibers are entangled to each other in a complicate manner due to rebound when the tension is released in a cutting mechanism to be described later. The tension applied on the fiber bundle (B) is defined as in a range from 1 to 500 mg/denier.

In FIG. 2, a rotary blade 10 is mounted to a cutting mechanism 9 and the rotary blade 10 advances interlocking with the rotation of the V-shaped gear 6, then moves horizontally so as to enter between each of the teeth 7 and 7, and disconnects the fiber bundle (B) about at a mid portion between the adjacent molten-fused structures (C) and (C). Upon completion of the disconnection, the rotary blade 10 returns to an original position. As a result of the disconnection, as shown in FIG. 1(*a*), a pre-form (D) for the ball-like structures comprising short fiber bundles (B) and (B) disposed to the right and left of the molten-fused structure (C) is obtained. The shape of the pre-form (D) becomes more spherical as the tension upon disconnection is stronger.

The pre-form (D) is guided to a subsequent heat-treatment step 13 by a belt conveyor 11 and a guide 12 respectively. As shown in FIG. 5, the heat-treatment step 13 has a structure similar to a rotary kiln and comprises a slightly inclined perforated cylinder 17 rotated by a motor 14, a blower 18, a heater 19, a duct 20, etc., wherein a hot blow blown from the blower 18 and warmed by the heater 19, is supplied through the duct 20 and the perforations of the perforated cylinder 17 as a heat source for the heat-treatment.

The pre-form (D) supplied through an opening of a back flow check plate 15 to the inside of the perforated cylinder 17 is warmed efficiently by the hot blow from the apertures of the perforated cylinder 17, rounded into ball-like structures while spirally rolling and shrinking in the perforated cylinder 17 under the rotation of the perforated cylinder 17 and the action of a dam 16 disposed on the perforated cylinder 17, and then incorporated from a discharge port on the opposite side of the back flow check valve 15 to a receiving vessel 21.

In the manufacturing method described above, it is necessary that the fiber diameter and the number of aligned fibers forming the fiber bundle (B), the level of the tension applied on the fiber bundle (B), the distance between the molten-fused structures (C) and (C), the thickness of the bundling plates (33) and (34) in the ultrasonic fusing device, the reduction ratio for the fiber bundle (B) by the bundling plates 33 and 34, the energy of the ultrasonic fusion and the temperature for the heat-treatment of the pre-form (D) are properly selected so as to satisfy the foregoing stipulations (a)–(c) given to the ball-like structures according to the present invention.

Descriptions will then be made to a method of using the ball-like structures (A) according to the present invention as a contacting materials for water-treatment.

Figure 6:
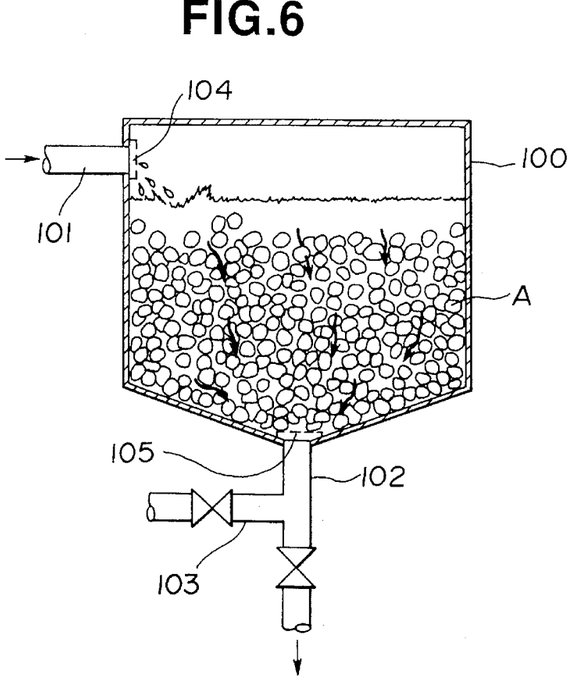
FIG. 6 is an explanatory view for an example of a water-treatment facility during treatment of wastewater.
Figure 7:
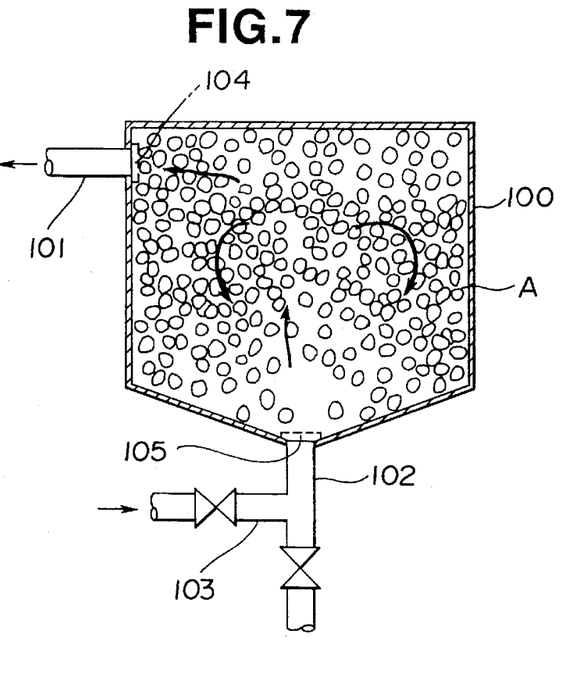
FIG. 7 is an explanatory view for an example of a water-treatment facility during backwashing treatment.

FIG. 6 is an explanatory view for an example of a facility for water-treatment during wastewater-treatment and FIG. 7 is an explanatory view for an example of a water-treatment facility during backwashing.

As shown in FIG. 6, the ball-like structures (A) according to the present invention are used while being contained at an adequate packing ratio in a vessel 100. Then, industrial wastewater, living wastewater or wastewater for fish culture (for example, trout and eel) is supplied from a pipeline 101 to the inside of the vessel 100 and then discharged through a pipeline 102. In the drawing, are also shown mesh filters 104 and 105, and a back washing pipeline 103.

The ball-like structures (A) of the present invention can provide good settling of microorganisms and settling of sludges to the ball-like structures, as well as favorable growth of the microorganisms. Accordingly, in a case of using the ball-like structures (A) according to the present invention as the contacting materials for water-treatment, since self-cleaning effect of the microorganisms can be fully attained effectively, clean-up of wastewater can be made more efficiently.

As shown in FIG. 7, a backwashing-treatment using the ball-like structures (A) according to the present invention is carried out by supplying a cleaning water at a predetermined flow rate from a pipeline 103 to violently agitate the ball-like structures (A). The effect of the backwashing is greater as the ball-like structures (A) are stirred more vigorously. In this case, although the ball-like structures (A) violently collide against each other, fibers are less detached in a case of the ball-like structures (A) according to the present invention. Accordingly, significant disadvantage such as clogging due to the detached fibers or abrading loss of the ball-like structures (A) can be avoided.

In the ball-like structures of the present invention, the number of detached fibers per unit structure upon tensile test is less than 1, and the detaching ratio of fibers to total 576,000 fibers for 100 ball-like structures in an accelerated washing test is not more than 0.5% in a case of using water and not more than 0.5% in a case of using an aqueous 5% hydrochloric acid solution.

According to the present invention described above, there is provided a novel ball-like structures formed from bundled, crimped fibers formed by rounding around the a central portion thereof as the core, in which the core is formed with the molten-fused structure. Then, since the ball-like structures of the present invention use no binding member made of metal, they can provide excellent effects in that burning-treatment can be applied easily, efficient backwashing-treatment with acid or alkali can be conducted, and in addition, there is scarce detachment of fibers.

EXAMPLES

Descriptions will be made more specifically to the present invention by way of examples but the invention is not restricted only to the following examples unless it does not go beyond the scope thereof.

In the following examples, a manufacturing device as shown in FIGS. 2 to 5 was used and an ultrasonic fusing device having bundling plates 33 and 34 each of 5 mm in thickness was used. Further, as the fibers constituting the fiber bundle (B), long fibers of 50% crimping rate made of vinylidene chloride synthetic resin having 70 denier of 24 filament 80 ply 3 gage, that is, 5760 multi-yarn bundle (bundled denier: 403, 200 denier) was used. The heat-shrinkage factor of the fibers was 15% (at 100° C.).

Example 1

At first, a fiber bundle (B) was supplied to a melt-fusing step (3) while applying a tension by a V-shaped gear 6 to such an extent that crimping of the fibers was removed to attain a substantially linear form, thereby forming molten-fused structures (C) each an 6 cm in interval. Melt-fusion was applied in V-shaped notches at the top ends of the bundling plates 33 and 34 by drawing the fiber bundle (B) such that the cross section of the fiber bundle (B), was about 30 mm$^2$, and under the conditions of ultrasonic power at 300 W, frequency at 20 KHz and amplitude of the oscillator 31 at 50 μm. The melt-fusing time was 0.8 sec while the cooling time was 2 sec. That is, the fiber bundle (B) was supplied intermittently to the melt-fusing step 3, and treated by melt-fusing the bundle under the effect of ultrasonic waves for 0.8 sec, interrupting the ultrasonic wave for 2 sec for cooling, then moving the fiber bundle (B) and repeating the melt-fusion and cooling.

Then, the fiber bundle (B) was disconnected at an intermediate portion between the molten-fused structures (C) and (C), the thus obtained short fiber bundles (B) were supplied to the heat-treatment step 13 and applied with a heat-treatment at a temperature of 90° to 110° C. to obtain the ball-like structures (A) of the present invention. The average staying-time of the bundle (B) in the heat-treatment step 13 was about 60 sec. The thus obtained ball-like structures (A) had uniform fiber distribution as far as the inside, showed nearly ideal-sphericalness and had a structure as shown in Table 1. Then, the ball-like structure (A) was measured for the number of the detached fibers and the amount of the detached fibers under an accelerated washing test by the following method and the results are shown in Table 1.

(1) Measurement for the number of detached fibers

A bundled portion (molten-fused structure (C)) of the ball-like structures was slightly retained by a finger and a single strand was pulled by the other hand to check whether it was detached or not. Fiber detachment was judged based on the length of the detached fiber in order to distinguish from fiber disconnection. Investigation was made for five times on every structural unit (number of strands investigated: 50). Then, an average value for the detached fibers was determined and expressed as a number of fibers per unit of the ball-like structures.

(2) Measurement for the amount of detached fibers by an accelerated washing test 100 units of ball-like structures and 30 liter of water or aqueous 5% solution of hydrochloric acid were charged in a house hold washing machine capable of forming a swirling stream and treated for 500 hours, then detached fibers were recovered, and the number of detached fibers was measured to determine the ratio of the detached fibers to total 576,000 fibers for 100 units of the ball-like structures served for the test.

Comparative Example 1

Ball-like structures were obtained in the same manner as in Example 1 except for reducing the ultrasonic fusing time to 0.4 sec. Table 1 shows the nature of the resultant ball-like structures and the result of evaluation. In the ball-like structures of this comparative example, since the fusing time was short, no uniform fused structure was formed, and as a result, the ratio of the specific gravity of the molten-fused structure based on the specific gravity of the crimped fibers forming the ball-like structures was as low as 50%, and a lot of detached fibers from the insufficiently fused portions were observed.

Comparative Example 2

Ball-like structures were obtained in the same manner as in Example 1 except for reducing the drawing ratio of the fiber bundle such that the cross sectional area was about 80 mm$^2$ in Example 1. The nature of the resultant ball-like structures and the result for evaluation are shown in Table 1. In the ball-like structures of this comparative example, the drawing ratio of the fiber bundle was made smaller, namely, the fiber bundle in the molten-fused portion was drawn loosely. As a result, a lot of fiber fused portions were formed in addition to the portions in which the fibers were fused as a bundle, namely, fusion was formed coarsely and the ratio of the withdrawing strength of the crimped fiber strand connected to the molten-fused structure to the linear strength of the crimped fiber strand itself used for the ball-like structures was reduced in which a lot of yarn disconnection was observed.

TABLE 1

|  | Example 1 | Comp. Example 1 | Comp. Example 2 |
| --- | --- | --- | --- |
| Diameter of structures | 33 | 33 | 33 |
| Appearance | sphere | sphere | sphere |
| Length of fused structure (mm) | 8 | 8 | 8 |
| Cross sectional area of fused structure (mm$^2$) | 31 | 44 | 39 |
| Specific gravity ratio (%) | 83 | 50 | 60 |
| Volume rate (%) | 2.3 | 3.3 | 2.9 |
| Diameter rate (%) | 24 | 24 | 24 |
| Strength rate (%) | 72 | 68 | 30 |
| Number of detached fibers (number/unit) | 0 | 3 | 1 |
| Amount of detached fibers measured by accelerated washing test (%) | | | |
| Water used | 0.22 | 8.8 | 11 |
| 5% aqueous hydrochloric acid used | 0.24 | 8.0 | 12 |

(Note): In Table 1, each of the terms has the following meanings.

Specific gravity ratio:
 A ratio of the specific gravity of the molten-fused structure divided by the specific gravity of the material that forms the crimped fibers (1.68 g/cm$^3$) for forming the ball-like structures. The specific gravity of the fused portion was measured and the ratio with respect to the specific ratio of the yarn was calculated. If the specific ratio of the fused portion is low, fusion is not uniform.

Volume rate:
 A rate of the volume of the molten-fused structure to the volume of the ball-like structures. The volume of the ball-like structures and the volume (approximate value) of the fused portion were measured. Then, the volume rate was calculated.

Diameter rate:
 A rate of the diameter of the molten-fused structure to the diameter of the ball-like structures. The ball-like structures were half-cut, and the diameter for the ball-like structures and the diameter for the fused portion were measured. Then, the diameter rate was calculated.

Strength ratio:

A ratio of the withdrawing strength of a crimped fiber strand connected to the molten-fused structure based on the linear strength of the crimped fiber strand itself used for the ball-like structures.

Comparative Example 3

Ball-like structures of 33 mm in diameter were obtained in the same manner as in Example 1 except for using a binding means of fine aluminum wires of 2.5 mm in diameter instead of ultrasonic fusion as a binding means in Example 1. The number of fibers detached was 0/unit and the amount of the fibers detached in water was 0.15% for the resultant ball-like structures. The ball-like structures of this comparative example were not usable in an aqueous 5% hydrochloric acid solution because of the poor chemical resistance of the fine aluminum wires and the amount of the fibers detached in the 5% aqueous hydrochloric acid was not measured.

Comparative Example 4

Ball-like structures of 33 mm in diameter were obtained in the same manner as in Example 1 except for using a binding means of plastic bands (trade name: Inshlock) of 3 mm in width instead of ultrasonic fusion as a binding means in Example 1. The number of fibers detached was 4/unit and the amount of the fibers detached in water was 19% for the resultant ball-like structures. Since the tightening force to the bundled portion was weak in the ball-like structures of this comparative example, a lot of detached fibers were observed.

Example 2

Ball-like structures were obtained in the same manner as in Example 1 except for reducing the ultrasonic fusing time to 0.6 sec. Table 2 shows the nature of the resultant ball-like structures and the result of evaluation.

Comparative Example 5

Ball-like structures were obtained in the same manner as in Example 1 except for reducing the ultrasonic fusing time to 0.6 sec and reducing the drawing ratio of the fibers such that the cross sectional area was about 50 mm. Table 2 shows the nature of the resultant ball-like structures and the result of evaluation.

TABLE 2

|  | Example 2 | Comp. Example 5 |
| --- | --- | --- |
| Diameter if structures | 33 | 33 |
| Appearance | sphere | sphere |
| Length of fused structure (mm) | 8 | 8 |
| Cross sectional area of fused structure (mm$^2$) | 34 | 37 |
| Specific gravity ratio (%) | 75 | 70 |
| Volume rate (%) | 2.4 | 2.6 |
| Diameter rate (%) | 24 | 24 |
| Strength rate (%) | 50 | 45 |
| Number of detached fibers (number/unit) | 0 | 1 |
| Amount of detached fibers measured by accelerated washing test (%) | | |
| Water used | 0.3 | 1.0 |
| 5% aqueous hydrochloric acid used | 0.28 | 0.8 |

What is claimed is:

1. Ball structures formed from bundled, crimped fibers rounded around a central portion thereof as a core, the core being formed from molten-fused fibers and having the following characteristics:

(a) a ratio of the specific gravity of the molten-fused fibers forming the ball structures divided by the specific gravity of the material that forms the fibers, expressed as a percentage, of at least 75%, (b) a length of the molten-fused fibers of 5 to 50% based on diameter of the ball structures, (c) a withdrawing strength of a crimped fiber strand connected to the molten-fused fibers of not less than 50% based on a linear strength of the crimped fiber strand itself used for the ball structures, (d) a core volume of 1 to 30% based on the volume of the ball structures, and (e) a crimping rate of the crimped fibers of from 10 to 75%.

2. Ball structures as defined in claim 1, wherein diameter of the ball structures is from 10 to 100 mm.

3. Ball structures as defined in claim 1, wherein the structures are formed by drawing bundled, crimped fibers around at about a central portion thereof, melting and fusing the fibers, and rounding the resulting molten-fused fibers into a spherical shape.

4. A contacting material for use in wastewater-treatment comprising the ball structures as defined in claim 1.

* * * * *